Feb. 23, 1954 G. F. ADAMS 2,670,317
EXTRACTION OF OLEAGINOUS MATERIALS FROM SOLID SUBSTANCES
Filed May 27, 1949
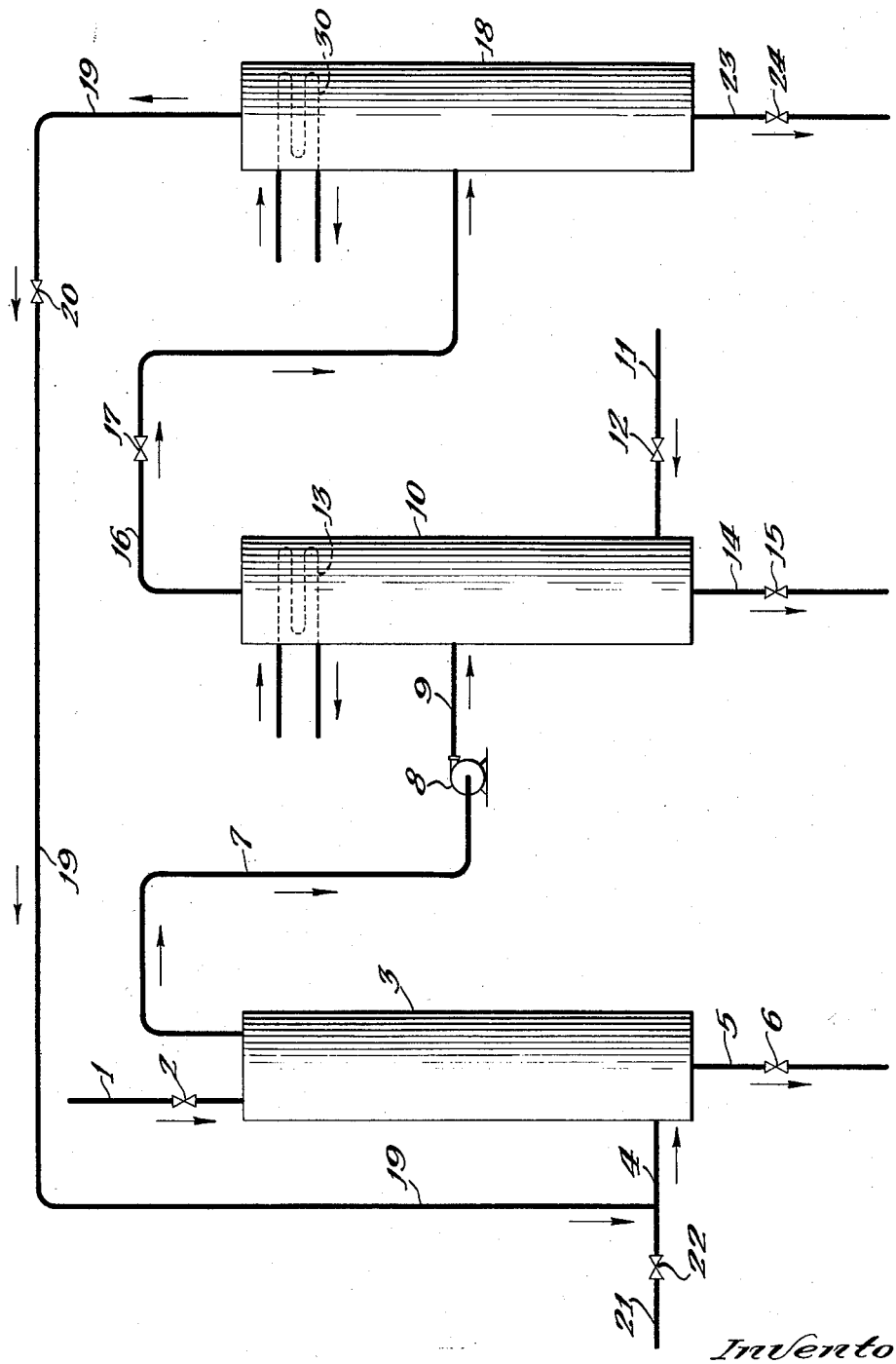
Inventor:
George F. Adams
By: M. P. Venema
Robert J. Newman
Attorneys Patented Feb. 23, 1954

2,670,317

UNITED STATES PATENT OFFICE 2,670,317

EXTRACTION OF OLEAGINOUS MATERIALS FROM SOLID SUBSTANCES

George F. Adams, Riverside, Ill., assignor to Universal Oil Products Company, Chicago, Ill., a corporation of Delaware Application May 27, 1949, Serial No. 95,753

4 Claims. (Cl. 196—14)

This invention relates to a novel method of extracting oleaginous substances from solids. It is more particularly concerned with a relatively simple and economical method of extracting oil from tar sands and the like.

A number of methods have been proposed for the recovery of hydrocarbons from solids such as shale, torbanite, and tar sand. One method comprises extraction with a solvent in which the hydrocarbons are readily soluble. Propane and other liquefied normally gaseous paraffins are excellent solvents at somewhat elevated temperatures. In addition, they possess the further advantage of enabling a separation between the oil and asphaltic constituents thereof to be effected by merely heating the liquid extract. However, the large scale adoption of continuous extraction processes utilizing solvents of this type has been hindered by the problems associated with the charging and discharging of solids to a vessel containing a liquefied volatile solvent under high pressure. The process that I have invented avoids this disadvantage of the prior art processes. My invention is based on the discovery that propane and similar substances will extract oil and asphalt from materials such as Athabaska tar sand near the atmospheric boiling point of the extractant.

In one embodiment my invention relates to a method of extracting oil from oleaginous solids which comprises contacting at substantially atmospheric pressure an oleaginous solid with a liquefied normally volatile solvent to dissolve the oil in said solvent, separating the solution of oil and solvent from the extracted solid, heating the solution under pressure to form at least two liquid phases, and recovering the solvent from said phases.

In a more specific embodiment my invention relates to the process of extracting bitumen-containing solid material which comprises dissolving at least a portion of the bitumen by contacting at substantially atmospheric pressure said solid material with a liquefied normally gaseous hydrocarbon, separating the solution from the extracted solid material, heating the solution to a temperature sufficient to precipitate an asphalt phase, separating and heating the remaining solution to precipitate an oil phase, recovering the solvent, and returning at least a portion thereof to the extraction step.

In a still more specific embodiment my invention relates to a process which comprises continuously counter-currently contacting at substantially atmospheric pressure finely divided tar sand with propane to thereby extract oil and asphalt from said tar sand and form a solution of oil, asphalt, and propane, withdrawing said solution and heating the same under pressure to a temperature sufficient to form two liquid phases comprising a propane-oil phase and an asphalt phase, separating said phases and heating the propane-oil phase under pressure to form a propane phase and an oil phase, separating said phases, and cooling and returning at least a portion of said propane phase to the extraction step.

The solid material charged to my process may be either organic or inorganic, but it should contain an oil, wax, bitumen, etc., that is capable of being extracted by the volatile solvents employed. My process is most beneficial when materials such as oil or tar sands, shales, lignites, torbanites, and the like, that contain oils and bitumens, comprise the charging stock. These materials ordinarily are crushed or pulverized to a relatively finely divided state before they are charged to the extraction step in order that more efficient and rapid extraction may be effected. My process can also be used to advantage in some instances in the extraction of oils from organic material such as soybean or cottonseed meal.

The extracting agents used in my process may be any volatile solvents that are capable of removing oleaginous materials from solids. However, my process is best carried out with hydrocarbons, particularly paraffins, that are normally in the vapor state at atmospheric pressure and temperature. Such hydrocarbons include methane, ethane, propane, isobutane, normal butane, and mixtures thereof. Because of its desirable properties, including its high solvent power and its ability to effect separation between the asphaltic and non-asphaltic hydrocarbons, propane usually is the extracting agent employed in my process.

Although my process may be conducted batchwise, the preferred method of operation is of the continuous type. My invention will now be further described in connection with one mode of continuous operation.

Referring to the drawing, finely divided Athabaska tar sand containing about 16% bitumen is passed through line 1 containing valve 2 into the top of extraction tower 3. Liquid propane enters tower 3 near the bottom through line 4. The pressure in the tower is atmospheric and the temperature is maintained at approximately —44° F., the atmospheric boiling point of propane. As the tar sand descends through tower 3 it is scrubbed by the upflowing stream of propane and the oil and asphaltic material in the tar sand dissolves in the propane. In order to effect better contact, mechanical agitation may be resorted to. The ratio of solvent to solid material that is employed is dependent upon the nature of the materials, including the amount of bitumen in the sand, and the degree of extraction desired. In this particular illustration, 0.5 gallon of propane per pound of tar sand will substantially completely remove all of the oil and asphalt from the sand and form a single hydrocarbon phase. If too much propane is used, asphalt sometimes precipitates out of the propane in this zone.

The extracted sand is removed from column 3 through line 5 containing valve 6, and may be sent to means for recovering the propane from the sand. The propane may then be returned to the system.

Propane containing dissolved oil and asphalt is withdrawn from column 3 and is passed through line 7, pump 8, and line 9 into column 10 near the middle thereof. Relatively cold (60–80° F.) propane is passed into column 10 near the bottom through line 11 containing valve 12. The material in the top of column 10 is heated to a temperature of about 150° F. by means of steam coils 13. Asphalt is precipitated from the solution in this column. The asphalt phase, being the heavier, starts for the bottom of the tower and, as it descends, it is scrubbed by the upcoming stream of propane, and the more soluble oil which may have started down with the asphalt is dissolved in the ascending propane. The asphalt, which contains a minor amount of propane, is withdrawn from column 10 through line 14 containing valve 15. The substantially asphalt-free, propane-oil phase is withdrawn from column 10 through line 16 containing valve 17 and is passed to column 18.

An alternative method of removing asphalt from the propane-oil-asphalt phase withdrawn from column 3 comprises passing said phase through a heater with or without additional propane and thereafter passing the heated solution into a settler, which would take the place of column 10.

The material in column 18 is heated by means of steam coils 30 to a temperature substantially equal to or somewhat in excess of the critical temperature of propane, i. e., 206° F. This causes the solution to separate into two phases; one of which is a substantially pure propane phase and the other of which is a gas oil phase containing some propane. The propane phase is withdrawn from column 18 through line 19 containing valve 20 and is cooled by means not shown on the drawing and is returned to column 3 via line 4. Considerable economy can be effected by heat-exchanging the propane flowing through line 19 with the feed to columns 10 and 18, i. e., the material flowing through lines 9 and 16. Additional propane may be added to or withdrawn from the system as required through line 21 containing valve 22. The gas oil phase is withdrawn from column 18 through line 23 containing valve 24 and is sent to propane recovery means.

As pointed out in connection with column 10, column 18 may be used as a settler if the material charged thereto has been heated to a temperature sufficient to form two phases. Another means of separating the oil and propane withdrawn as a solution from column 10 comprises vaporizing the propane. However, this method requires a great deal more heating and cooling than does the method described.

From the foregoing it can be seen that I have invented a method of removing oleaginous materials from solids containing the same, said method being characterized by the use of liquefied normally gaseous solvents at substantially atmospheric pressure. The charging and discharging of solid material to high pressure equipment is avoided and excellent extractions and separations can be easily and economically effected. My process is particularly advantageous when used to extract oil and asphalt from petroleum-bearing solids such as tar sands.

I claim as my invention:
1. A process for extracting oil and asphalt from a solid material containing the same, which comprises contacting the solid material with a liquefied normally gaseous hydrocarbon solvent at approximately atmospheric pressure and at about the atmospheric boiling point of the solvent to dissolve oil and asphalt in the solvent, separating the resultant solution from the solid material, heating said solution under pressure to precipitate asphalt therefrom and recovering the precipitated asphalt, further heating the remaining solution of oil and solvent under pressure to at least the critical temperature of said solvent to form a liquid oil phase and a liquid solvent phase, and separating said phases from each other.

2. The process of claim 1 further characterized in that at least a portion of the separated solvent phase is returned to the extraction step.

3. The process of claim 1 further characterized in that said solvent comprises propane.

4. The process of claim 1 further characterized in that said solid material is a tar sand.

GEORGE F. ADAMS.

References Cited in the file of this patent

UNITED STATES PATENTS

| Number | Name | Date |
|---|---|---|
| 1,607,977 | Armstrong | Nov. 23, 1926 |
| 2,115,003 | Beiswenger | Apr. 26, 1938 |
| 2,132,441 | Rosenthal | Oct. 11, 1938 |
| 2,188,012 | Pilat et al. | Jan. 23, 1940 |
| 2,202,389 | Lewis et al. | May 28, 1940 |
| 2,252,864 | Schaafsma | Aug. 19, 1941 |
| 2,284,583 | Lewis | May 26, 1942 |
| 2,367,671 | Dickinson et al. | Jan. 23, 1945 |